March 22, 1966

C. BANCROFT 3,241,531

ROTARY PISTON ENGINE

Filed Oct. 12, 1962

INVENTOR.
CHARLES BANCROFT
BY
Kenyon & Kenyon
ATTORNEYS

March 22, 1966 C. BANCROFT 3,241,531
ROTARY PISTON ENGINE
Filed Oct. 12, 1962 9 Sheets-Sheet 4

INVENTOR.
CHARLES BANCROFT
BY
Kenyon & Kenyon
ATTORNEYS

March 22, 1966 C. BANCROFT 3,241,531
ROTARY PISTON ENGINE
Filed Oct. 12, 1962 9 Sheets-Sheet 6

INVENTOR.
CHARLES BANCROFT
BY
Kenyon & Kenyon
ATTORNEYS

INVENTOR.
CHARLES BANCROFT
BY
Kenyon + Kenyon
ATTORNEYS

March 22, 1966 C. BANCROFT 3,241,531
ROTARY PISTON ENGINE
Filed Oct. 12, 1962 9 Sheets-Sheet 9

INVENTOR.
CHARLES BANCROFT
BY
Kenyon + Kenyon
ATTORNEYS 3,241,531
ROTARY PISTON ENGINE
Charles Bancroft, Ferris Hill Road, New Canaan, Conn.
Filed Oct. 12, 1962, Ser. No. 230,136
25 Claims. (Cl. 123—11)

This invention relates to a rotary piston engine of the internal combustion type and more particularly to an engine in which the pistons alternately accelerate and decelerate while moving in a rotary manner about an annular chamber.

A rotary piston engine of the type in which the pistons alternately accelerate and decelerate while moving in a rotary manner is shown in my U.S. Patent No. 2,852,007, issued September 16, 1958, for "Rotary Piston Engine." In the rotary engine of the patent, the annular chamber and pistons are located on one end of the engine assembly while the drive for transmitting the power impulses from the rotary pistons to the crankshaft is positioned at the other end of the assembly. This side-by-side construction necessitates an arrangement of nested tubular shaft members extending from the rotary pistons to the drive apparatus. Due to the extent of the engagement of the tubular members, this arrangement presents a source of frictional loss. Furthermore, this arrangement makes it possible for leakage of the pressure gases to take place along the tubular members.

While not mandatory, it is normally desirable in the side-by-side arrangement to use a crankshaft extending completely through the engine assembly with output shafts at either or both ends as may be required. Such a crankshaft adds to the weight of the engine and can increase its overall size. Because of this constructional arrangement, the possible compact and light weight design features of the rotary pistons and annular chamber normally have not been fully realized throughout the engine assembly.

In the engine of the patent, driving rings are employed to couple the pistons to the connecting members and then to the crankshaft. The arrangement of a driving ring for each assembly of pistons necessitates the coaxial positioning of the rings to reduce the space requirement and to enable the rings to support one another for rotation. Thus the provision of the driving rings can increase length of the crankshaft and lead to an arrangement of concentric bearings which can be more difficult to lubricate.

In prior art rotary engines it is possible for adjacent pistons to remain proximate to another another for a dwell period after compression and before ignition. The dwell period results from the motion characteristic of the linkage coupling the pistons to the output shaft. Since the fluid is pressurized prior to the dwell period it is possible for leakage to occur at this point.

In view of the foregoing, it is an object of the invention to provide a more compact rotary machine for the handling of fluids.

It is another object of the invention to minimize leakage from the annular chamber of the machine.

It is still another object of the invention to reduce the friction between the various moving parts especially those related to the rotary pistons.

It is still another additional object of the invention to provide a rotary engine which can more effectively convert internal pressure into useable torque.

It is a further object of the invention to improve the structural strength of the rotary support member from which the pistons extend.

It is still a futrher object of the invention to eliminate problems of internal clearance within the engine in transmitting the driving motion of the pistons to the output shaft by eliminating the need of a solid crankshaft extending throughout the entire engine.

It is an additional object of the invention to enable a plurality of engine units to be connected to one another in a compact and efficient manner.

In one embodiment of the invention, the rotary piston fluid displacement device comprises a stator assembly having an annular chamber in which a plurality of rotary piston assemblies of the angular accelerating and decelerating type are movable about its central axis. Each of the assemblies includes a tubular support member from which a plurality of pistons extend into the chamber. Means are provided for admitting and releasing fluid with respect to the chamber. The device further includes a pair of rotary connecting members each having its central axis of rotation offset from the central axis of the chamber and each being disposed adjacent opposite ends of the plurality of piston assemblies. Means are provided for revolving the central axis of each of the connecting members about the central axis of the chamber. Further included are means for providing an eccentric pivotal connection between the central axis of one of the rotary connecting members and the external shaft of the device. The device also has means engaging the tubular support member and engaging the rotary connecting members for angularly accelerating and decelerating the pistons when said one rotary connecting member is revolving. With this arrangment, the rotary connecting members link the pistons to the external shaft and also couple segments of crankshafts together without the need of an integral crankshaft extending through the engine.

In another embodiment of the invention there is included a pair of rotary connecting members each having its central axis of rotation offset from the central axis of the chamber and each of the rotary connecting members is disposed adjacent opposite ends of the plurality of piston assemblies. Means are provided which extend from one of the rotary connecting members to a portion of the plurality of tubular support members for angularly accelerating and decelerating the pistons thereof when the rotary connecting member is revolving. In the same manner, additional means are provided which extend from the other rotary connecting member to the other portion of the plurality of support members. The device further includes an additional rotary connecting member with means extending therefrom to each of the portions of the plurality of tubular supports in order to couple the portions to one another. In this way each portion of the plurality of support members are interconnected and also connected to the rotary connecting members.

In another embodiment of the invention means are provided for bypassing fluid from between a piston adjacent one side of a given piston to between a piston adjacent the other side of the given piston in order to enable the fluid to be rapidly expanded immediately following compression.

In still another embodiment of the invention gear means such as trammel gear means are disposed adjacent the tubular support members and rotary connecting members for transmitting the angular accelerations and decelerations of the pistons to the output shaft or shafts.

In a further embodiment of the invention the stator assembly includes an annular chamber disposed about a cavity and the tubular support members of the rotary piston assemblies are also disposed about the cavity. The various elements of the device between the angular accelerating and decelerating pistons and the external shaft are disposed in the cavity. In this way the device is made more compact.

In an additional embodiment of the invention the tubular support members are provided with labyrinth seal means to prevent leakage from the annular chamber.

In still another embodiment of the invention a plurality of engine units are connected together along a common axis of rotation.

The rotary piston fluid displacement engine embodying the principles of the present invention is illustrated by the accompanying drawings in which.

Figure 1:
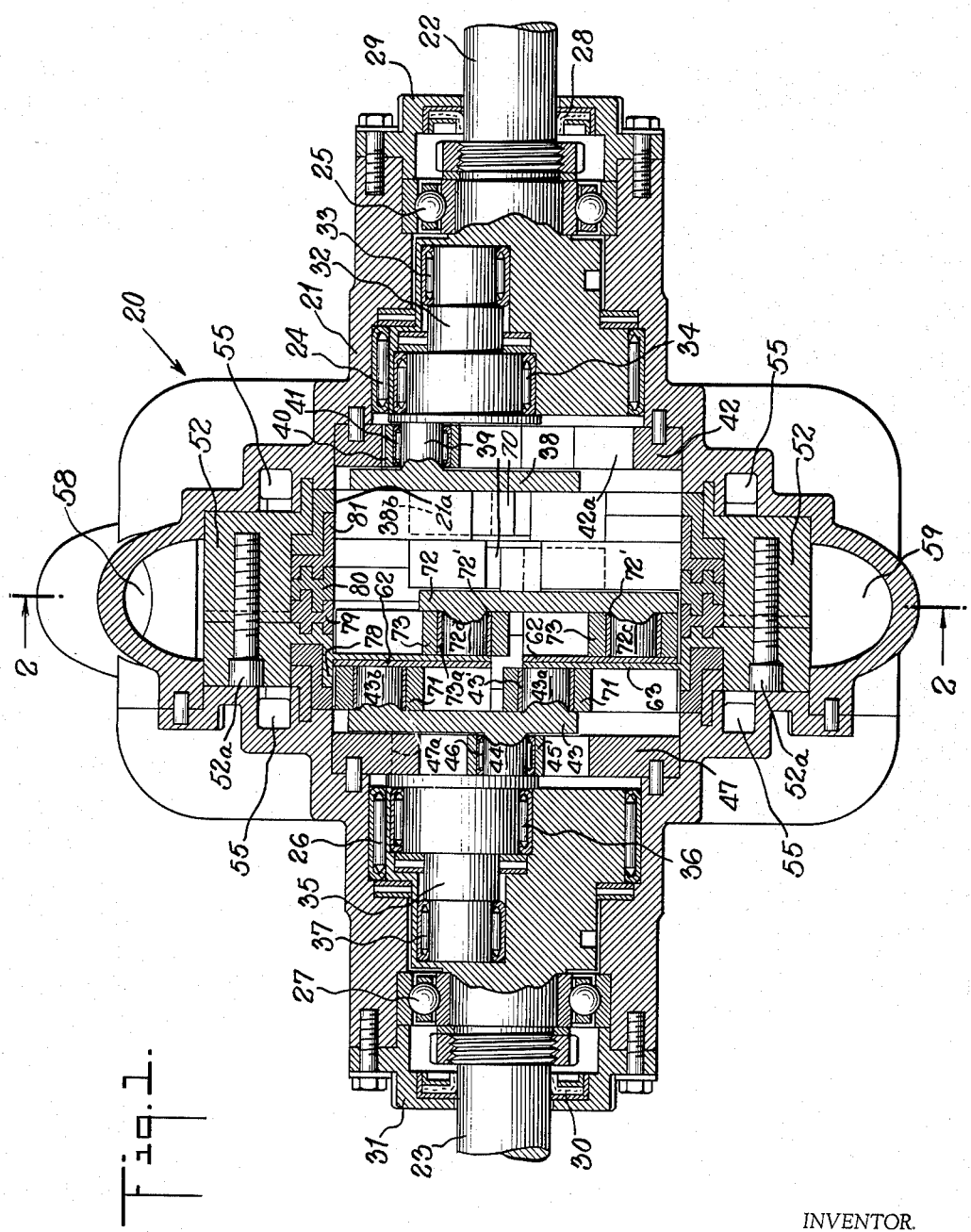
FIG. 1 is a vertical section view of the invention showing four pairs of rotary pistons with two different pairs of pistons connected to each rotary connecting member and with all four pairs connected to a third connecting member.

An embodiment of the engine of the invention is shown in FIG. 1. Engine 20 includes stator assembly or casing 21 from which extends external or output shafts 22 and 23. The stepped portion of shaft 22 within casing 21 is supported by needle bearing 24 and ball bearing 25. Similarly the stepped portion of shaft 23 is supported by needle bearing 26 and ball bearing 27. Oil seal 28 mounted in housing 29 prevents the escape of the lubricant adjacent shaft 22 while shaft 23 is provided with oil seal 30 mounted within housing 31.

Eccentric shaft 32 which is the means for providing an eccentric pivotal connection to external or output shaft 22 is mounted within the end portion of output shaft 22 offset from its center line and the central axis of the casing. Eccentric shaft 32 which is stepped is supported by needle bearing 33 and 34 within shaft 22. In a similar manner, eccentric shaft 35 is supported by needle bearings 36 and 37 within the stepped portion of shaft 23. With this arrangement the output shafts are free to rotate with respect to the casing while the eccentric shafts are free to rotate about their own axes as they revolve with the output shafts.

Figure 3:
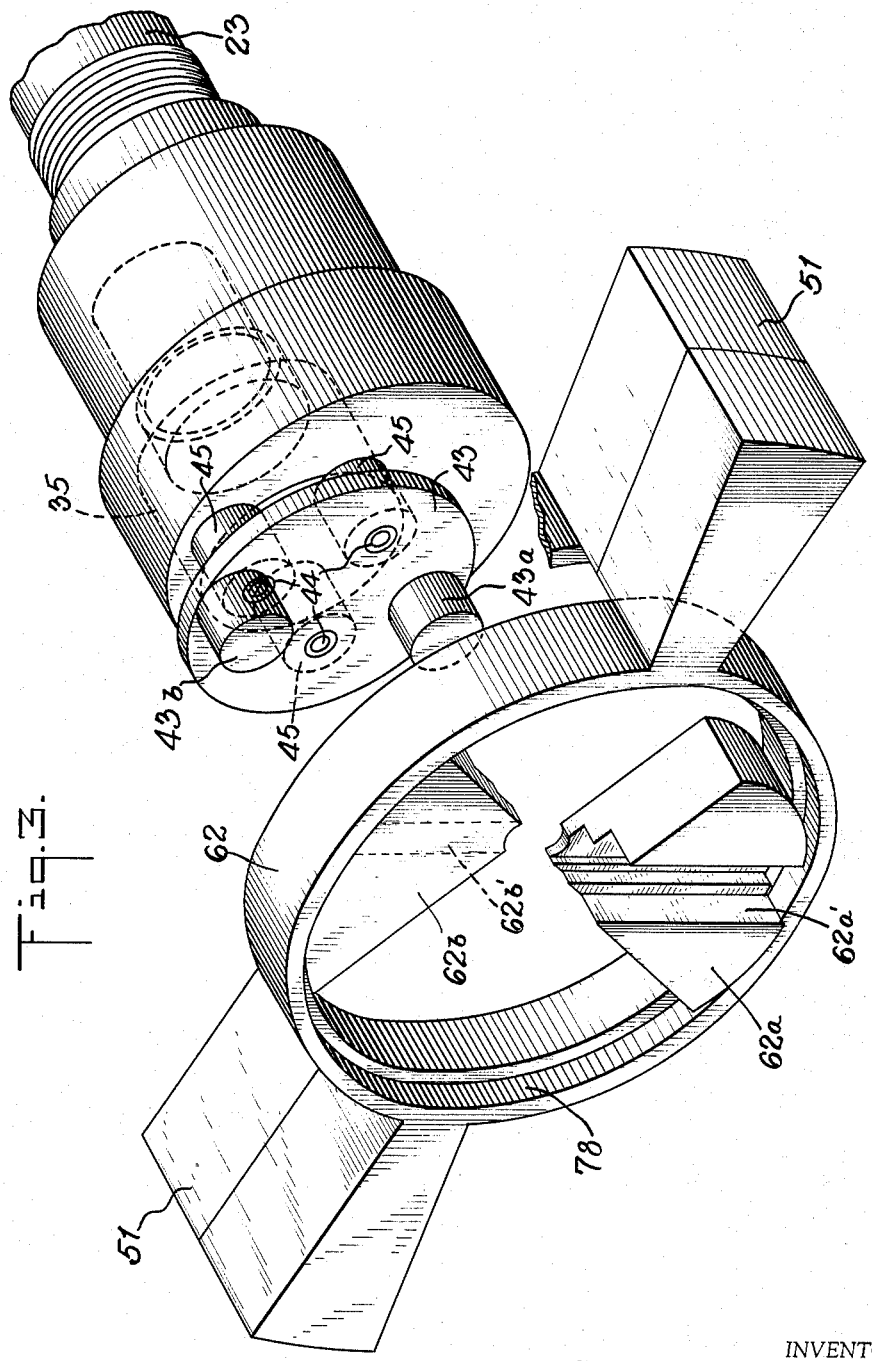
FIG. 3 is an enlarged perspective view of one of the means for providing an eccentric pivotal connection to the external shaft and of one of the tubular support members with its pair of pistons.
Figure 4:
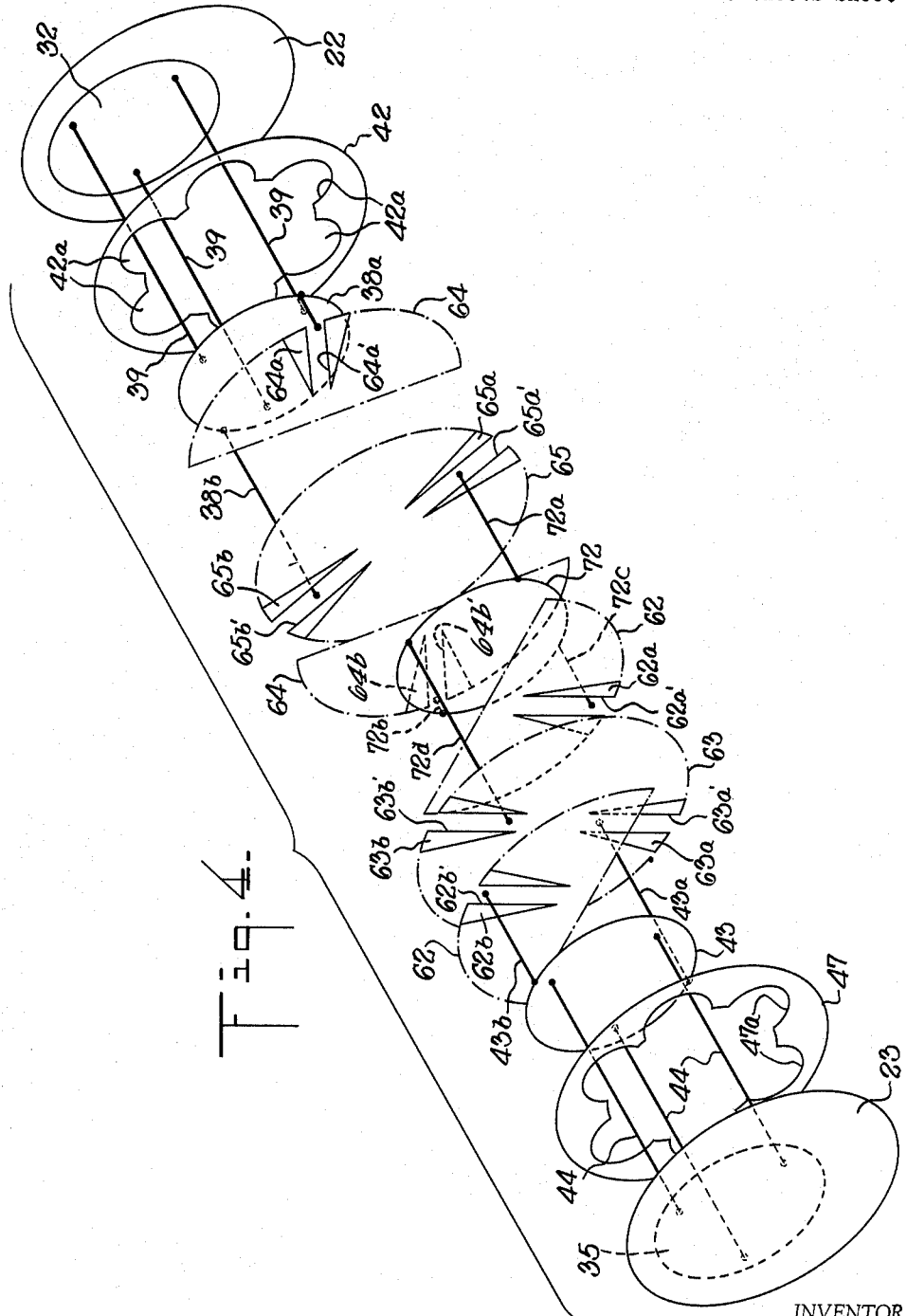
FIG. 4 is an exploded schematic view of the tubular support members, the rotary connecting members, and the additional connecting member for an engine having four pair of rotary pistons.
Figure 5:
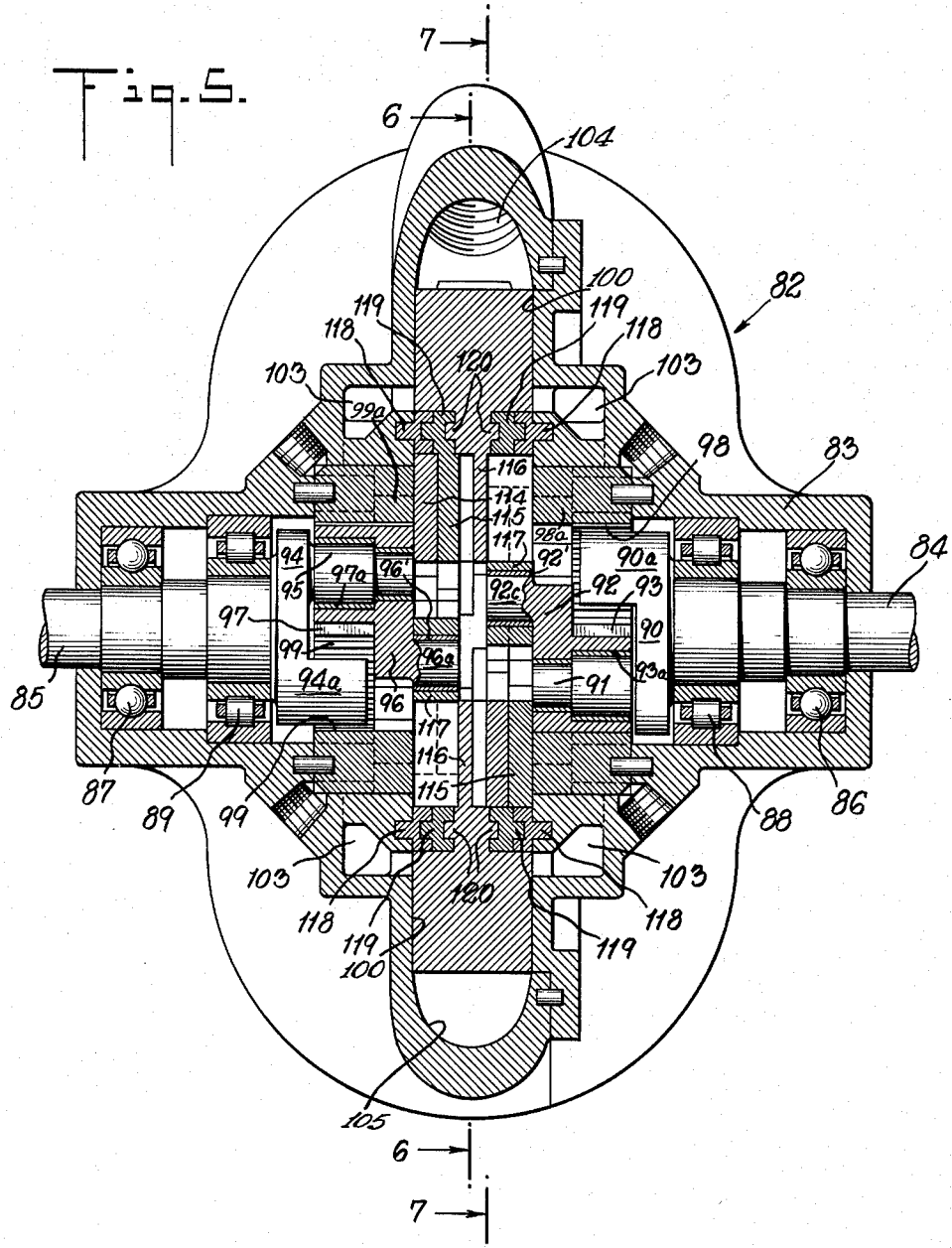
FIG. 5 is a vertical section view of an embodiment of the engine having three pairs of rotary pistons which are engaged to each of the rotary connecting members.

As shown in FIG. 3, eccentric shaft 35 is provided with rotating connecting member 43 which is mounted with respect to the eccentric shaft by studs 44. Rollers 45 which are mounted by needle bearing 46 upon studs 44 engage slots 47a in plate 47 in the manner of trammel gears. Thus as rotary support member 43 rotates about its own axis, it also revolves about the central axis of shaft 23 as rollers 45 advance along slots 47a (FIG. 4). With this arrangement it can be seen that upon rotation of rotary support member 43, eccentric shaft 35 is rotated and in turn revolves about shaft 23. Eccentric shaft 32 includes a similar arrangement of rotary connecting member 38 supported by studs 39. Rollers 40 are mounted by needle bearing 41 on studs 39. By virtue of its engagement with slots 42a in plate 42, rotary support member 38 is caused to rotate about its own axis and also to revolve about shaft 22 as the shaft rotates.

Figure 2:
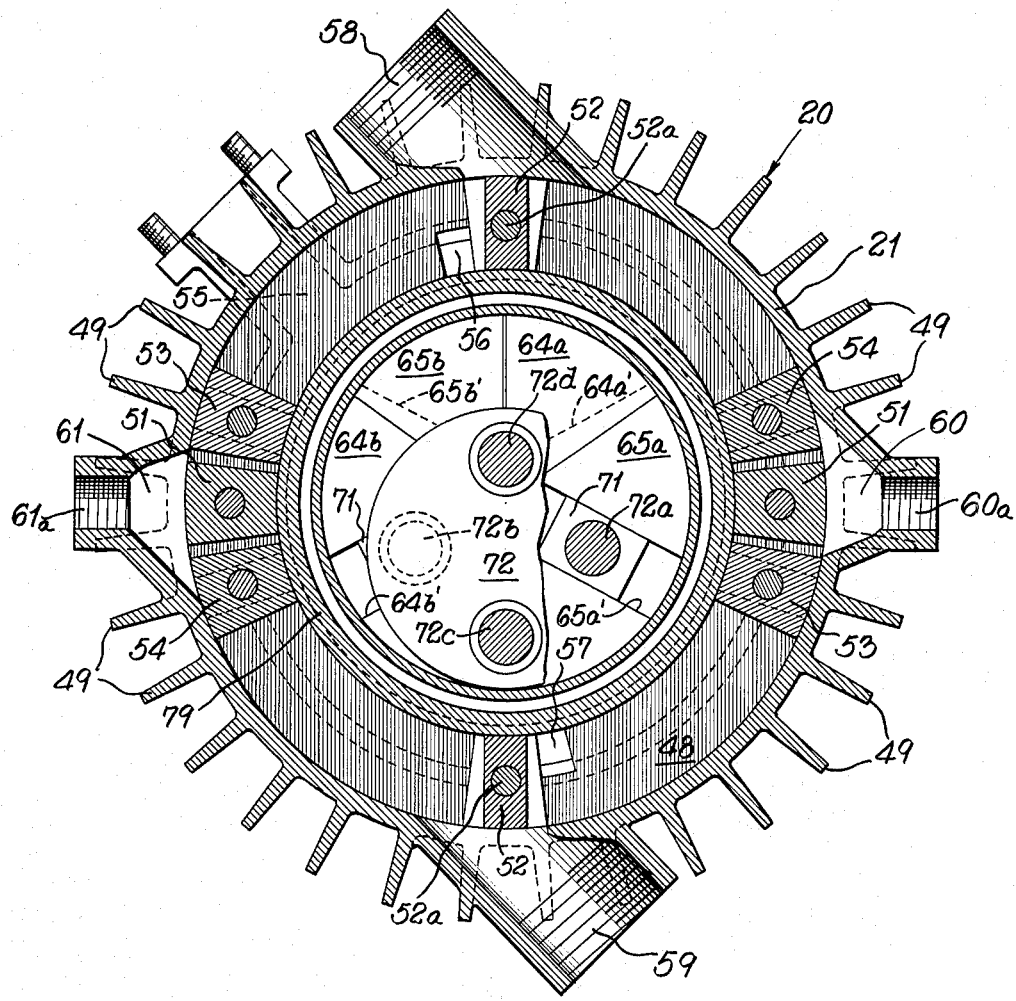
FIG. 2 is a vertical section view taken along the line 2—2 in FIG. 1 showing the rotary pistons within the annular chamber with one pair of pistons at the top dead center position.

As shown in FIG. 2, engine 20 includes annular chamber 48 adjacent the outter wall of casing 21 which is provided with a plurality of cooling fins 49. Four pairs of vane pistons 51–54 are disposed with a chamber 48 and are adapted to rotate in a circular manner about the chamber. One piston of each pair is located diametrically opposite the other piston. The intake and exhaust portions of the displacement cycle of operation of engine 20 only are substantially related to the device set forth in my United States Patent No. 2,852,007, issued September 16, 1958, for "Rotary Piston Engine".

The fuel and air mixture for the engine is delivered to intake passages 55 located adjacent the sides of the annular chamber. The mixture flows through the passages to intake ports 56 and 57 leading to annular chamber 48. Exhaust flow takes place through exhaust ports 58 and 59. Since the pistons rotate counterclockwise and the crankshaft clockwise as shown in FIG. 2, it can be seen that the flow path to the exhaust ports is substantially a tangential one. The fuel air mixture after being admitted into the annular chamber is compressed by the closing movement of adjacent pistons.

As shown in FIG. 2 pistons 53 draw in a fresh charge through the intake ports as they move in the counterclockwise direction beyond the ports. Thus a negative pressure area is formed between each of piston 53 and 52. Prior to the induction of a charge between pistons 53 and 52, a charge was induced between pistons 51 and 53. Consequently, the motion of pistons 53 serves to compress the charge between pistons 51 and 53.

As shown in FIG. 2 during the dwell portion of the cycle, three of the piston assemblies have their related pistons adjacent to firing chambers 60 and 61. At this point the charge compressed between pistons 51 and 53 is exposed to the interior of bypass or firing chambers 60 and 61 and are thereby transferred to the area between pistons 51 and 54. Since pistons 54 are leaving the dwell portion of the cycle, the charge transferred to the firing chambers can immediately expand following ignition. Thus the firing chambers enable the compressed gas to be delivered to a location between the pistons and where it can be immediately expanded. In this way compressed gas is not held during the dwell portion of the cycle at which time undesirable leakage could otherwise occur.

Openings 60a and 61a extending into firing chambers 60 and 61, respectively, are provided with spark plugs or other ignition devices to fire the fuel air mixture. Instead of spark plugs, openings 60a and 61a are adapted to receive fuel injectors for engines which receive merely a charge of air at passages 55. Openings 60a and 61a can serve as flow ports whenever engine 20 is adapted to be operated as a pumping device.

Pairs of vane pistons 51–54 are attached to tubular support members 62–65, respectively. As shown in FIGS. 3 and 4, support members 62–65 are each provided with two sectors 62a and b–65a and b, respectively, each having slide grooves 62a and b–65a and b, respectively. In order to connect rotary connecting member 38 with tubular support members 64 and 65, journals 38a and 38b of the rotary connecting member 38 having bushings 38' are fitted with slide blocks 70 which are adapted to be mounted within the slide grooves 64a' and 65b' of sectors 64a and 65b, respectively.

At this point it can be seen that the journals of the rotary connecting member have a predetermined line of travel since the rotary connecting member rotates about its own axis and revolves due to the engagement of rollers 40 with slots 42a. In turn by engaging journals 38a and b of the rotary connecting member to the slide grooves in the sectors of the tubular support members, it can be seen that a predetermined accelerating and decelerating motion is obtained for the pistons during their rotation within the annular chamber. The arrangement at rotary connecting member 43 is similar to that of member 38 in that member 43 is provided with journals 43a and b and bushings 43' to engage slide blocks 71 disposed in slide grooves 63a' and 62b' of sectors 63a and 62b, respectively, of tubular support members 62 and 63, respectively. Thus, two different adjacent tubular support members of the plurality of tubular support members and their related pistons are in engagement with each of the rotary connecting members. With the two rotary connecting members and eccentric shafts, it becomes necessary to maintain a predetermined relationship between them. This is achieved by the use of additional rotary connecting member 72 which contains journals 72a and b on the right side and 72c and d on the left side as shown in FIG. 1. The journals of additional rotary connecting member 72 are provided with bushings 72' and slide blocks 73. Thus by means of the slide blocks, journals 72a and b are engaged with slide grooves 65a' and 64b', respectively, and journals 72c and d are engaged with slide grooves 62a' and 63b', respectively. In effect both the pair of rotary connecting members 38 and 43 as well as additional rotary connecting member 72 are the means for coupling the rotary support members in order that the pistons accelerate and decelerate in a predetermined manner.

In operation the slide grooves in the sectors of the rotary support members act as the journals of additional connecting member 72 in such a manner as to urge the journals inwardly toward the central axis of casing 21 due to the inertia of the piston sets when they are caused to accelerate or decelerate. At the same time, however, the revolving of member 72 in a circular path about the central axis of the casing results in centrifugal force urging member 72 including the journals outwardly. Therefore the forces applied to the journals and therefore member 72 and the centrifugal forces act in opposite directions and the opposing forces tend to cancel out one another with the result that member 72 is only moderately loaded during operation.

In order to prevent the entry of pressured gas into the vicinity of cavity 21a in casing 21, labyrinth seal rings 78–81 are used to seal the tubular support members 62–65, respectively, with respect to the inner circumference of annular chamber 48 (FIG. 1). Due to this arrangement the pistons can be fabricated from portions which are alternately assembled by means of bolts 51a–54a extending through the pistons 51–54, respectively. Thus the various elements linking the tubular support members to the output shaft are consolidated substantially within cavity 21a in order that a compact engine results. Furthermore the placing of the pistons about the circumference of the tubular support members serves to minimize the radial engagement forces between the pistons and the outer circumference of annular chamber 48 and to reduce friction.

In accordance with the cycle of fluid displacement in Patent No. 2,852,007, gases between pistons 52 and 54 as shown in FIG. 2 are the products of combustion and are released at their maximum velocity by ports 58 and 59 so that centrifugal force urging the products through the exhaust ports is also at a maximum. The reduction in pressure in the portion of the chamber around pistons 52 and 54 and between pistons 52 and 54 resulting from the escape of the exhaust gas urges the intake of the fuel air mixture through intake ports 56 and 57 as pistons 52 pass this location. For low speed operation, the engine can be provided with a super charger or blower to facilitate the charging of the fres mixture into the chamber and to assist in scavenging the exhaust gas therefrom.

Another embodiment of the invention is shown in FIGS. 5–8. Engine 82 includes stator or casing 83 from which extend output shafts 84 and 85. The shafts have stepped portions supported within the casing by means of ball bearings 86 and 87, as well as roller bearings 88 and 89, respectively. Crank arm 90 with counterweight 90a extending from shaft 84 is provided with stepped journal 91 about which is pivoted the means in engagement with the stator or casing for revolving the central axis of the rotary connecting members about the central axis of the annular chamber. Thus rotary connecting member 92 including pinion 93 is mounted with bushing 93a for rotation about stepped journal 91. In a similar manner, output shaft 85 is provided with crank arm 94 from which extends counterweight 94a. Crank arm 94 has stepped journal 95 about which rotary connecting member 96 is mounted. Member 96 is also provided with pinion 97 and bushing 97a which rotate with member 96 about journal 95. Pinions 93 and 97 engage stationary ring gears 98 and 99, respectively. Thus any displacement of the rotary connecting members is transmitted to the stepped journals and causes the pinions to rotate with respect to the ring gears as the crank arms are revolved about the axis of the output shafts or vice versa.

Figure 6:
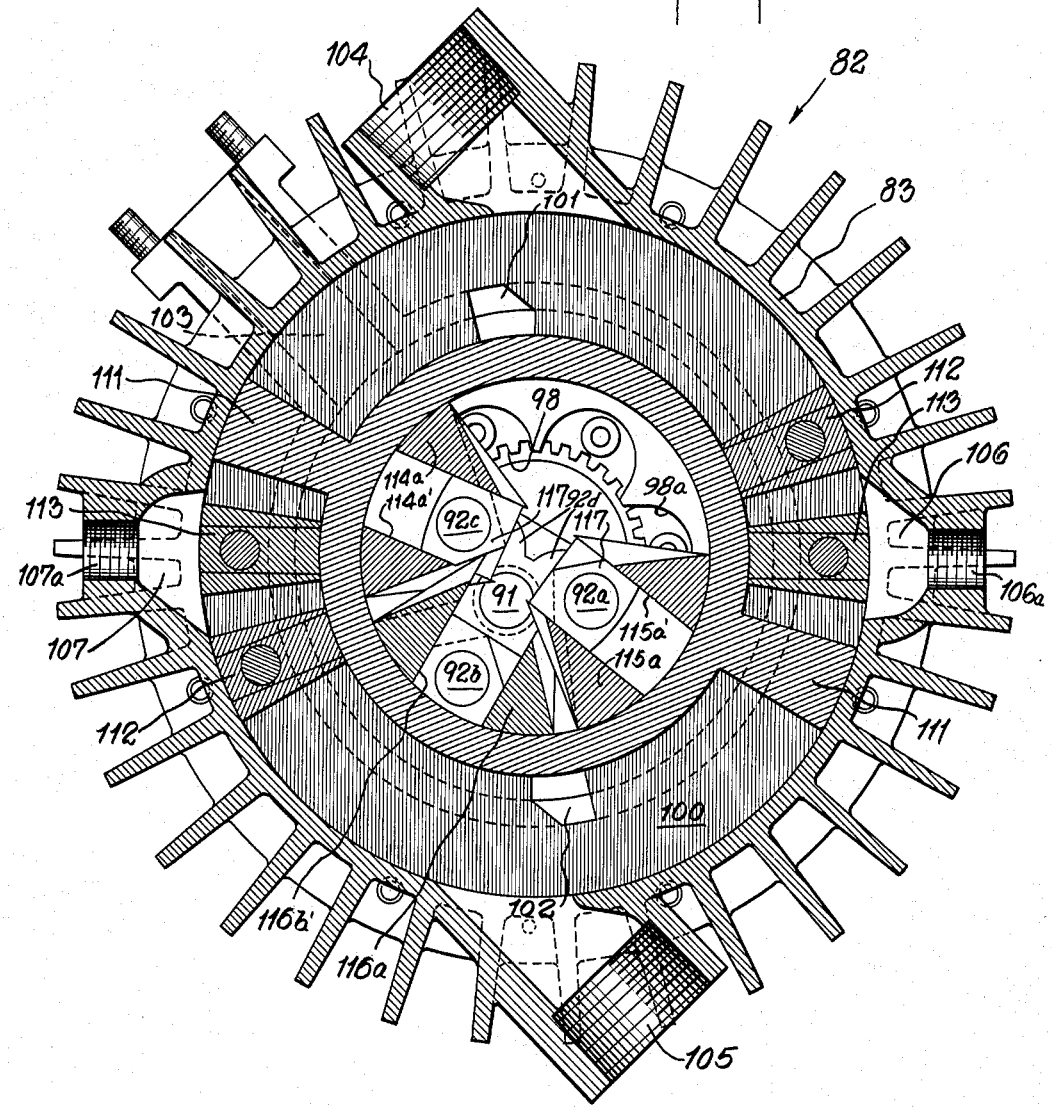
FIG. 6 is a vertical section view taken along the line 6—6 in FIG. 5 and showing a pair of pistons at the top dead center position.
Figure 7:
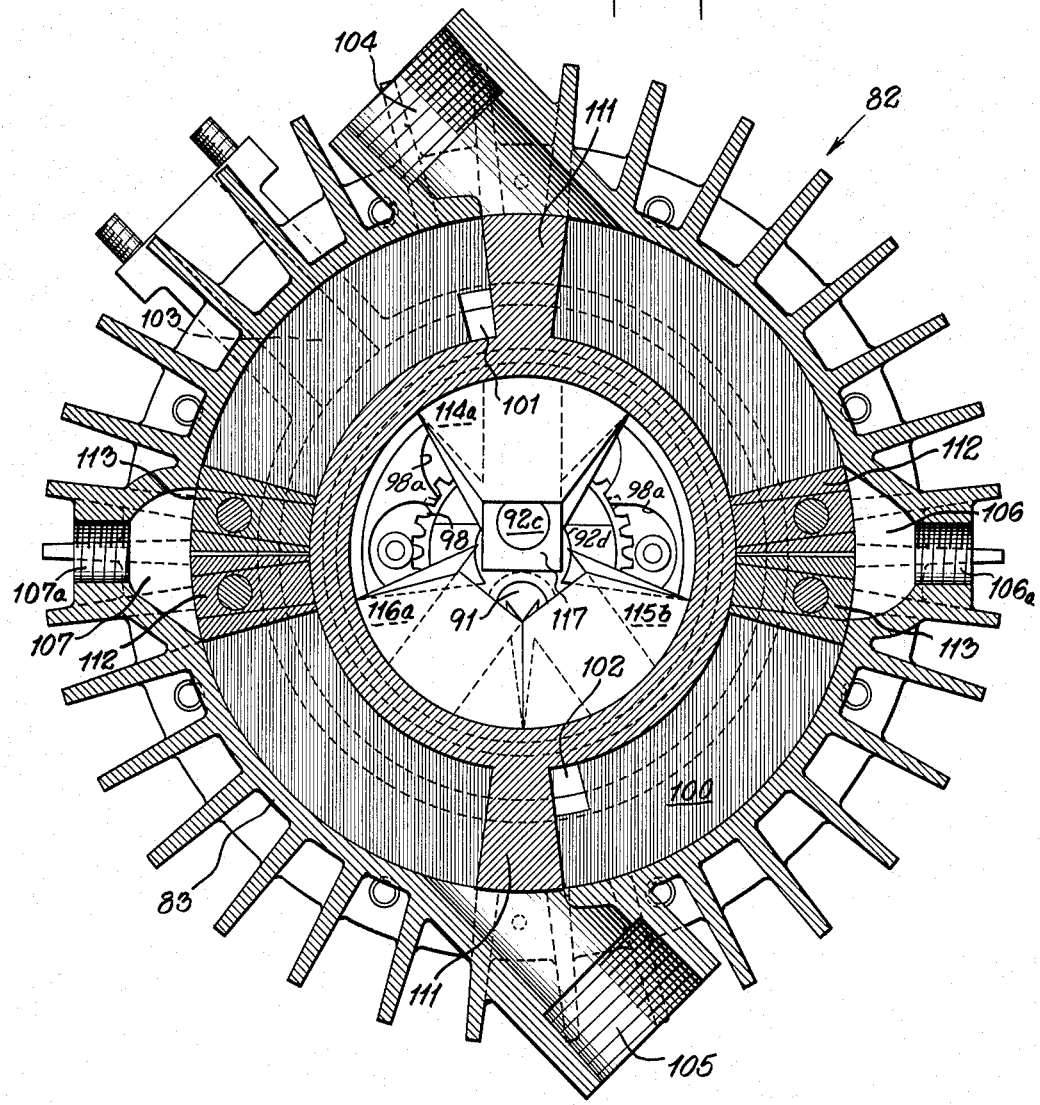
FIG. 7 is a vertical section view taken along the line 7—7 in FIG. 5 and showing the position of the pistons at 30° before the top dead center position.

As shown in FIGS. 6 and 7, rotary connecting member 92 can be provided with a clover-leaf section having circular leaves or lobes 92d. The lobes engage and cooperate with slots 98a which are mounted in a fixed manner adjacent to ring gear 98. The lobes which move with respect to the slots in the manner of trammel gears mentioned above serve to protect the gear teeth from overload conditions or shock loading during operation of the device. With this arrangement the drive for the rotary connecting member includes not only a pinion, such as pinion 93 of FIG. 8, but also a slotted member such as slotted plate 42 of FIG. 4. Rotary connecting member 96 can be similarly provided with a clover-leaf section having lobes 96d in engagement with slots 99a.

Figure 8:
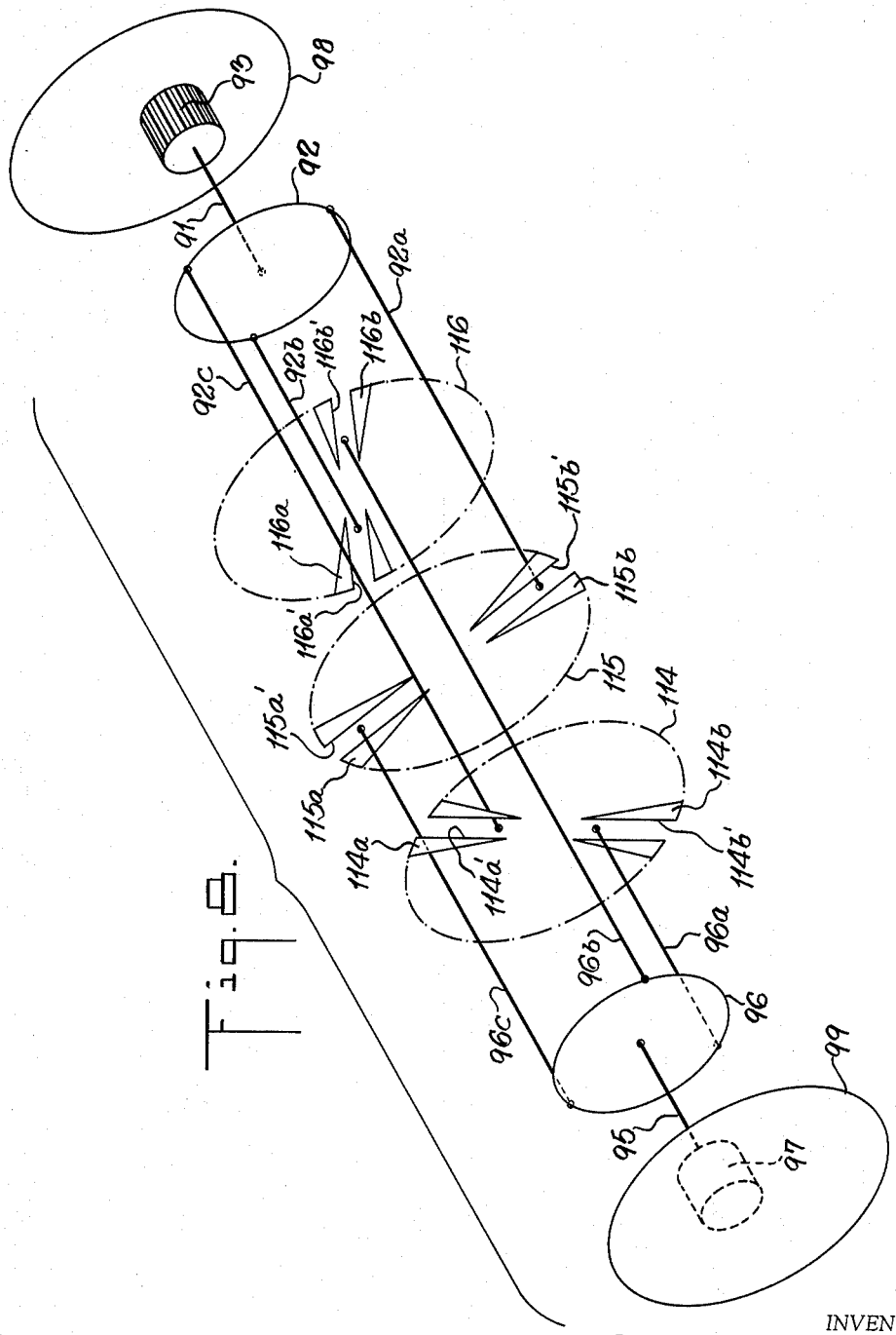
FIG. 8 is an exploded schematic view of the tubular support members and rotary connecting members for an engine having three pair of rotary pistons.

Similarly as discussed above with respect to the engine having eight pistons, engine 82 includes annular chamber 100 with intake ports 101 and 102 connected to intake passage 103 (FIG. 6). The chamber is further provided with exhaust ports 104 and 105 and firing chambers 106 and 107 having openings 106a and 107a. Pistons 111–113 comprise three pairs with one piston of each pair positioned diametrically opposite the other. Pistons 111–113 are attached to tubular support members 114–116, respectively. Tubular support members 114–116 are provided with sectors 114a and b–116a and b, respectively which have slide grooves 114a' and b'–116a' and b', respectively. Rotary connecting member 92 is provided with journals 92a–92c, as shown in FIG. 8. Slide blocks 117 are mounted by means of bushings 92' on each of the journals. By means of the slide blocks disposed in the slide grooves, journals 92a–92c are engaged with slide grooves 115b', 116a', and 114a', respectively.

The journals of rotary connecting member 96 are provided with sliding blocks 117 mounted thereon by bushings 96'. In this way journals 96a–96c are engaged with sliding grooves 114b', 116b' and 115a', respectively. Slide blocks 117 mounted upon journals 92a–c and 96a–c of rotary connecting members 92 and 96, respectively, transmit the drive from the pistons to the output shafts. To prevent leakage of the high pressure gas from the annular chamber into the interior cavity of the stator adjacent the drive for the pistons, labyrinth seal rings 118–120 are employed.

As shown in FIG. 7 the engine is at a position corresponding to approximately 30° before top dead center. At this point exhaust gas passes from between pistons 111 and 112 to the exhaust ports. At the same time a charge is being induced through the intake ports into the space between pistons 111 and 113.

FIG. 6 shows the engine at approximately the top dead center position. Here the charge between pistons 111 and pistons 113 has been compressed and is being transferred by means of the firing chambers 106 and 107 to the space between pistons 113 and 112. Consequently, at this location the engine is conditioned for the ignition portion of the cycle following which pistons 112, in response to the expanding gas, move rapidly away from pistons 113 since pistons 112 are beyond the dwell portion of their cycle. Ports 106a and 107a are adapted to receive ignition devices, fuel injectors, and in the case of the pump version of the invention to serve as flow ports.

It should be understood that in each engine configuration the slide grooves which are to engage a given rotary connecting member as well as the sectors adjacent to them are disposed in substantially a common plane when the engines are assembled. Thus journals of a common standard length on each rotary connecting member can engage the slide grooves related to that member. It should be further understood that the angular form of each sector is selected to prevent interference with the other sectors during the movement of one rotary support member with respect to the other. A limiting condition of the sectors is only reached when the number of rotary support members, that is the number of pairs of pistons, requires such a reduction in the arcuate extent of the sector to insure clearance that the structural strength of the sector becomes insufficient to withstand the bending loads applied to it.

Figure 9:
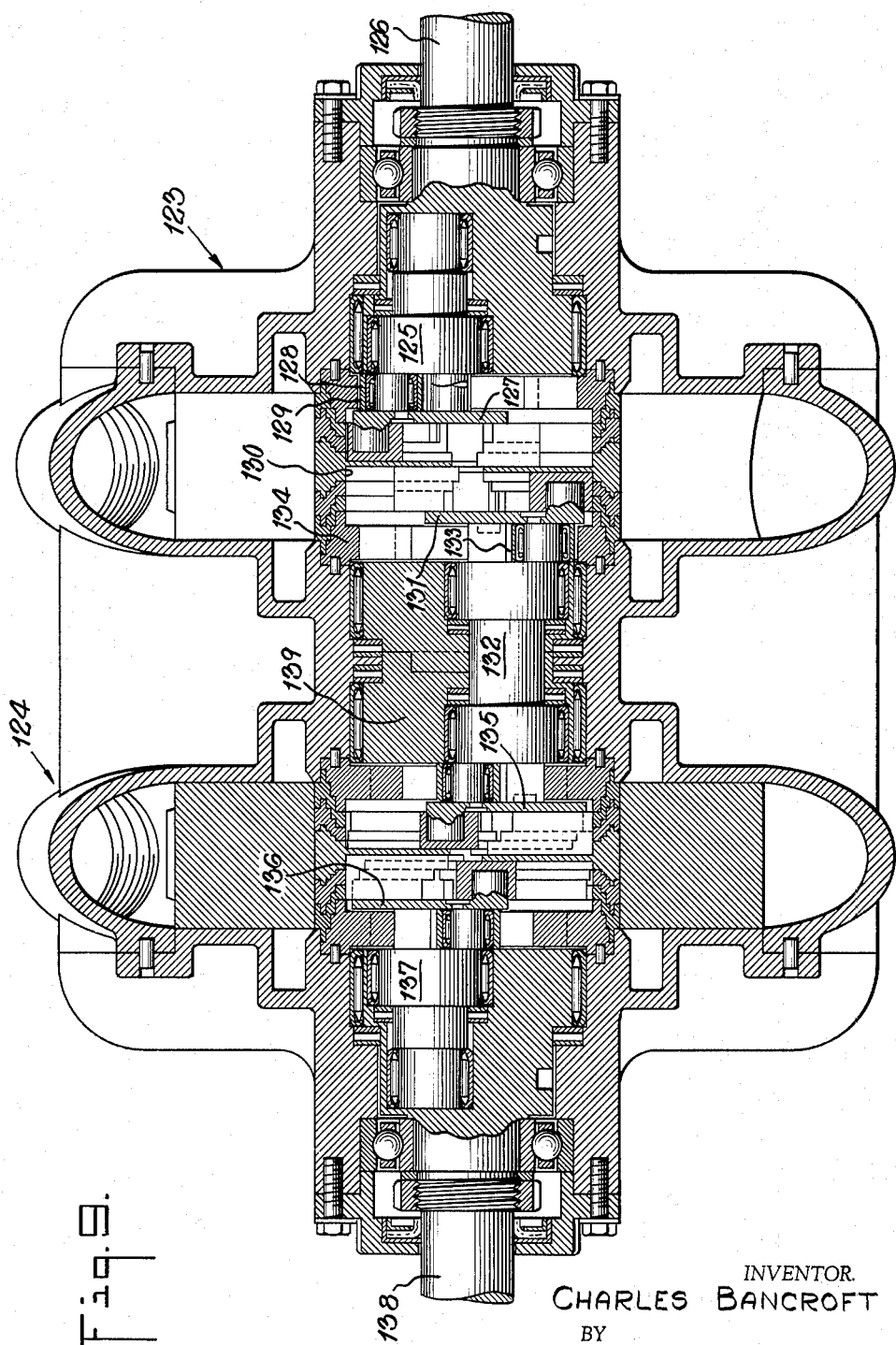
FIG. 9 is a vertical section view showing two of the engine units of the invention coupled to one another by means of common crankshaft segments and common connecting members to deliver the combined output of the two.

Another embodiment of the invention is shown in FIG. 9 wherein two engine assemblies are connected together to provide two output shafts. Each of the engine units or banks 123 and 124 in FIG. 9 are similar with respect to the piston arrangement and connecting arrangement as that of engine 83 while the eccentric shaft arrangement is similar to that of engine 20. Eccentric shaft 125 is mounted in an offset fashion with respect to the center line of output shaft 126. Rotary connecting member 127 is connected to eccentric shaft 125. The trammel gear arrangement including rollers 128 extending from shaft 125 and slotted plate 129 cause member 127 to revolve within cavity 130 as shaft 126 rotates. In a similar manner rotary connecting member 31 attached to eccentric coupling shaft 132 is caused to revolve by the action and rollers 133 and slotted plate 134. Each of the rotary connecting members is connected by journals and sliding blocks to the slide grooves of the rotary support members for the pistons. Similarly in engine unit 124 rotary connecting member 135 is attached to eccentric coupling shaft 132 while rotary connecting member 136 is connected to eccentric shaft 137. Shaft 137 is mounted in an offset manner with respect to external or output shaft 138.

Eccentric coupling shaft 132 is supported for revolution about the center axis of the casing of the engine units by coupling shaft 139. In this manner two or more engine units can be coupled together adjacent to one another in order to obtain a multi-bank or multi-unit engine with each unit disposed along a common central axis.

In each of the embodiments of the invention it should be understood that the device is adapted to serve as a fluid motor or fluid pump in addition to serving as an internal combustion engine. Thus in the case of a fluid motor, pressured fluid is delivered to the inlet ports of the device and is permitted to expand within the casing in order to drive the rotary piston assemblies and the output shaft which can be connected to a load. In the case of a fluid pump the output shaft is driven in rotation and fluid delivered to the inlet ports is compressed by the accelerating and decelerating motion of the rotary piston assemblies and delivered as a pressured fluid to the outlet ports.

What is claimed:

1. A rotary piston fluid displacement device comprising a stator assembly having an annular chamber, a plurality of rotary piston assemblies of the angular accelerating and decelerating type movable along a common path of travel within said chamber about the central axis thereof, each of said assemblies including a tubular support member and a plurality of pistons mounted upon said tubular support member and extending therefrom into said chamber, each piston of each of said plurality of piston assemblies facing at least one piston of a different piston assembly, means for admitting fluid into said chamber, means for releasing fluid from said chamber, a crankshaft assembly consisting of a pair of separate shafts spaced apart from one another along the axis of rotation of said crankshaft assembly which extends along the central axis of said chamber, said shafts being disposed for rotation about said central axis, a pair of rotary connecting members each having a central axis of rotation and each being provided with an eccentric pivotal connection of its central axis with a different one of said shafts, the central axis of each of said rotary connecting members being offset from the central axis of said chamber, each of said rotary connecting members being disposed adjacent different opposite ends of said plurality of rotary piston assemblies, means in engagement with said stator assembly for revolving each of said connecting members about its central axis as said central axes are rotated about the central axis of said chamber, and means engaging said tubular support members and engaging said rotary connecting members for angularly accelerating and decelerating said pistons when said rotary connecting members are revolving.

2. A rotary piston fluid displacement device comprising a stator assembly having an annular chamber, a plurality of rotary piston assemblies of the angular accelerating and decelerating type movable along a common path of travel within said chamber about the central axis thereof, each of said assemblies including a tubular support member and a plurality of pistons mounted upon said tubular support member and extending therefrom into said chamber, each piston of each of said plurality of piston assemblies facing at least one piston of a different piston assembly, means for admitting fluid into said chamber, means for releasing fluid from said chamber, a crankshaft assembly consisting of a pair of separate shafts spaced apart from one another along the axis of rotation of said crankshaft assembly which extends along the central axis of said chamber, said shafts being disposed for rotation about said central axis, a pair of rotary connecting members each having a central axis of rotation and each being provided with an eccentric pivotal connection of its central axis with a different one of said shafts, the central axis of each of said rotary connecting members being offset from the central axis of said chamber, each of said rotary connecting members being disposed adjacent different opposite ends of said plurality of rotary piston assemblies, means in engagement with said stator assembly for revolving each of said connecting members about its central axis as said central axes are rotated about the central axis of said chamber, and means extending from each of said rotary connecting members to said tubular support members for angularly accelerating and decelerating said pistons when said rotary connecting members are revolving.

3. A rotary piston fluid displacement device comprising a stator assembly having an annular chamber, a plurality of rotary piston assemblies of the angular accelerating and decelerating type movable within said chamber about the central axis thereof, each of said assemblies including a tubular support member, a plurality of pistons mounted upon said tubular support member and extending therefrom into said chamber, means for admitting fluid into said chamber, means for releasing fluid from said chamber, an external shaft, a pair of rotary connecting members each having its central axis of rotation offset from the central axis of said chamber, each of said rotary connecting members being disposed adjacent different opposite ends of said plurality of rotary piston assemblies, means in engagement with said stator for revolving the central axis of each of said connecting members about the central axis of said chamber, means for providing an eccentric pivotal connection between the central axis of one of said rotary connecting members and said external shaft, means extending from one of said rotary connecting members to a portion of said plurality of tubular support members for angularly accelerating and decelerating the pistons thereof when said one rotary connecting member is revolving, additional means extending from the other of said rotary connecting members to the other portion of said plurality of tubular support members for angularly accelerating and decelerating said pistons when said other rotary connecting member is revolving, an additional rotary connecting member, and means extending from said additional rotary connecting member to each portion of said plurality of tubular support members for coupling said portions to one another.

4. A rotary piston fluid displacement device comprising a stator assembly having an annular chamber, a plurality of rotary piston assemblies of the angular accelerating and decelerating type movable within said chamber about the central axis thereof, each of said assemblies including a tubular support member, a plurality of pistons mounted upon said tubular support member and extending therefrom into said chamber, means for admitting fluid into said chamber, means for releasing fluid from said chamber, an external shaft, a pair of rotary connecting members each having its central axis of rotation offset from the central axis of said chamber, each of said rotary connecting members being disposed adjacent different opposite ends of said plurality of rotary piston assemblies, means in engagement with said stator for revolving the central axis of each of said connecting members about the central axis of said chamber, means for providing an eccentric pivotal connection between the central axis of one of said rotary connecting members and said external shaft, and trammel gear means disposed adjacent said tubular support members and said rotary connecting members for angularly accelerating and decelerating said pistons when said one rotary connecting member is revolving.

5. A rotary piston fluid displacement device comprising a stator assembly having an annular chamber, a plurality of rotary piston assemblies of the angular accelerating and decelerating type movable within said chamber about the central axis thereof, each of said assemblies including a tubular support member, a plurality of pistons mounted upon said tubular support member and extending therefrom into said chamber, means for admitting fluid into said chamber, means for releasing fluid from said chamber, an external shaft, a pair of rotary connecting members each having its central axis of rotation offset from the central axis of said chamber, each of said rotary connecting members being disposed adjacent different opposite ends of said plurality of rotary piston assemblies, means in engagement with said stator for revolving the central axis of each of said connecting members about the central axis of said chamber, means for providing an eccentric pivotal connection between the central axis of one of said rotary connecting members and said external shaft, and trammel gear means engaging said tubular support members and engaging said rotary connecting members for angularly accelerating and decelerating said pistons when said one rotary connecting member is revolving.

6. A rotary piston fluid displacement device comprising a stator assembly having an annular chamber, a plurality of rotary piston assemblies of the angular accelerating and decelerating type movable within said chamber about the central axis thereof, each of said assemblies including a tubular support member, a plurality of pistons mounted upon said tubular support member and extending therefrom into said chamber, means for admitting fluid into said chamber, means for releasing fluid from said chamber, an external shaft, a rotary connecting member having its central axis of rotation offset from the central axis of said chamber, means in engagement with said stator for revolving the central axis of said connecting member about the central axis of said chamber, means for providing an eccentric pivotal connection between the central axis of said rotary connecting member and said external shaft, and trammel gear means disposed adjacent said tubular support members and said rotary connecting member for angularly accelerating and decelerating said pistons when said one rotary connecting member is revolving.

7. A rotary piston fluid displacement device comprising a stator assembly having an annular chamber, a plurality of rotary piston assemblies of the angular accelerating and decelerating type movable within said chamber about the central axis thereof, each of said assemblies including a tubular support member, a plurality of pistons mounted upon said tubular support member and extending therefrom into said chamber, means for admitting fluid into said chamber, means for releasing fluid from said chamber, an external shaft, a pair of rotary connecting members each having its central axis of rotation offset from the central axis of said chamber, each of said rotary connecting members being disposed adjacent different opposite ends of said plurality of rotary piston assemblies, means in engagement with said stator for revolving the central axis of each of said connecting members about the central axis of said chamber, means for providing an eccentric pivotal connection between the central axis of one of said rotary connecting members and said external shaft, trammel gear means disposed adjacent one of said rotary connecting members and a portion of said plurality of tubular support members for angularly accelerating and decelerating the pistons thereof when said one rotary connecting member is revolving, additional trammel gear means disposed adjacent the other of said rotary connecting members and the other portion of said plurality of tubular support members for angularly accelerating and decelerating said pistons when said other rotary connecting member is revolving, an additional rotary connecting member, and further trammel gear means disposed adjacent said additional rotary connecting member and each portion of said plurality of tubular support members for coupling said portions to one another.

8. A rotary piston fluid displacement device comprising a stator assembly having an annular chamber disposed about a cavity, a plurality of rotary piston assemblies of the angular accelerating and decelerating type movable along a common path of travel within said chamber about the central axis thereof, each of said assemblies including a tubular support member, said tubular support members being disposed about said cavity, a plurality of pistons mounted upon said tubular support member and extending therefrom into said chamber, each piston of each of said plurality of piston assemblies facing at least one piston of a different piston assembly, means for admitting fluid into said chamber, means for releasing fluid from said chamber, a crankshaft assembly consisting of a pair of separate shafts spaced apart from one another along the axis of rotation of said crankshaft assembly which extends along the central axis of said chamber, said shafts being disposed for rotation about said central axis, a pair of rotary connecting members each having a central axis of rotation, and each being provided in said cavity with an eccentric pivotal connection of its central axis with a different one of said shafts, the central axis of each of said rotary connecting members being offset from the central axis of said chamber, each of said rotary connecting members being disposed in said cavity adjacent different opposite ends of said plurality of rotary piston assemblies, means disposed in said cavity in engagement with said stator assembly for revolving each of said connecting members about its central axis as said central axes are rotated about the central axis of said chamber, and means disposed in said cavity and extending from said tubular support members to said rotary connecting members for angularly accelerating and decelerating said pistons when said rotary connecting members are revolving.

9. A rotary piston fluid displacement device comprising a stator assembly having an annular chamber disposed about a cavity, a plurality of rotary piston assemblies of the angular accelerating and decelerating type movable within said chamber about the central axis thereof, each of said assemblies including a tubular support member, said tubular support members being disposed about said cavity, a plurality of pistons mounted upon said tubular support member and extending therefrom into said chamber, means for admitting fluid into said chamber, means for releasing fluid from said chamber, an external shaft, a pair of rotary connecting members each having its central axis of rotation offset from the central axis of said chamber, each of said rotary connecting members being disposed in said cavity adjacent different opposite ends of said plurality of rotary piston assemblies, means disposed in said cavity in engagement with said stator for revolving the central axis of each of said connecting members about the central axis of said chamber, means disposed in said cavity for providing an eccentric pivotal connection between the central axis of one of said rotary connecting members and said external shaft, means disposed in said cavity and extending from one of said rotary connecting members to a portion of said plurality of tubular support members for angularly accelerating and decelerating said pistons when said one rotary connecting member is revolving, additional means disposed in said cavity and extending from the other of said rotary connecting members to the other portion of said plurality of tubular support members for angularly accelerating and decelerating said pistons when said other rotary connecting member is revolving, an additional rotary connecting member disposed in said cavity, and means disposed in said cavity and extending from said additional rotary connecting member to each portion of said plurality of tubular support members for coupling said portions to one another.

10. A rotary piston fluid displacement device comprising a stator assembly having an annular chamber, a plurality of rotary piston assemblies of the angular accelerating and decelerating type movable within said chamber about the central axis thereof, each of said assemblies including a tubular support member having a radially extending slide, a plurality of pistons mounted upon said tubular support member and extending therefrom into said chamber, means for admitting fluid into said chamber, means for releasing fluid from said chamber, an external shaft, a pair of rotary connecting members each having its central axis of rotation offset from the central axis of said chamber, each of said rotary connecting members being disposed adjacent different opposite ends of said plurality of rotary piston assemblies, means in engagement with said stator for revolving the central axis of each of said connecting members about the central axis of said chamber, means for providing an eccentric pivotal connection between the central axis of one of said connecting members and said external shaft, and means extending from each of said rotary connecting members to the radially extending slides of said tubular support members for angularly accelerating and decelerating said pistons when said rotary connecting members are revolving.

11. A rotary piston fluid displacement device comprising a stator assembly having an annular chamber, a plurality of rotary piston assemblies of the angular accelerating and decelerating type movable within said chamber about the central axis thereof, each of said assemblies including a tubular support member having a radially extending slide, a plurality of pistons mounted upon said tubular support member and extending therefrom into said chamber, means for admitting fluid into said chamber, means for releasing fluid from said chamber, a crankshaft member having its axis of rotation extending along the central axis of said chamber, said crankshaft member being disposed without said cavity and extending away from adjacent an end portion of said plurality of rotary piston assemblies, a rotary connecting member having its central axis of rotation offset from the central axis of said chamber, means in engagement with said stator for revolving the central axis of said connecting member about the central axis of said chamber, means for providing an eccentric pivotal connection between the central axis of said connecting member and said crankshaft member, and means extending from said rotary connecting member to the radially extending slides of said tubular support members for angularly accelerating and decelerating said pistons when said rotary connecting member is revolving.

12. A rotary piston fluid displacement device comprising a stator assembly having an annular chamber, a plurality of rotary piston assemblies of the angular accelerating and decelerating type movable within said chamber about the central axis thereof, each of said assemblies including a tubular support member having a radially extending slide, a plurality of pistons mounted upon said tubular support member and extending therefrom into said chamber, means for admitting fluid into said chamber, means for releasing fluid from said chamber, an external shaft, a pair of rotary connecting members each having its central axis of rotation offset from the central axis of said chamber, each of said rotary connecting members being disposed adjacent different opposite ends of said plurality of rotary piston assemblies, means in engagement with said stator for revolving the central axis of each of said connecting members about the central axis of said chamber, means for providing an eccentric pivotal connection between the central axis of one of said rotary connecting members and said external shaft, means extending from one of said rotary connecting members to the radially extending slides of a portion of said plurality of tubular support members for angularly accelerating and decelerating the pistons thereof when said one rotary connecting member is revolving, additional means extending from the other of said rotary connecting members to the radially extending slides of the other portion of said plurality of tubular support members for angularly accelerating and decelerating said pistons when said other rotary connecting member is revolving, an additional rotary connecting member, and means extending from said additional rotary connecting member to the radially extending slides of each portion of said plurality of tubular supports for coupling said portions to one another.

13. A rotary piston fluid displacement device comprising a stator assembly having an annular chamber, a plurality of rotary piston assemblies of the angular accelerating and decelerating type movable along a common path of travel within said chamber about the central axis thereof, each of said assemblies including a tubular support and a plurality of pistons mounted upon said tubular support member and extending therefrom into said chamber, each piston of each of said plurality of piston assemblies facing at least one piston of a different piston assembly, labyrinth seal means disposed adjacent the end portions of said tubular support members to prevent leakage from said chamber to said cavity, means for admitting fluid into said chamber, means for releasing fluid from said chamber, a crankshaft assembly consisting of a pair of separate shafts spaced apart from one another along the axis of rotation of said crankshaft assembly which extends along the central axis of said chamber, said shafts being disposed for rotation about said central axis, a pair of rotary connecting members each having a central axis of rotation and each being provided with an eccentric pivotal connection of its central axis with a different one of said shafts, the central axis of each of said rotary connecting members being offset from the central axis of said chamber, each of said rotary connecting members being disposed adjacent different opposite ends of said plurality of rotary piston assemblies, means in engagement with said stator assembly for revolving each of said connecting members about its central axis as said central axes are rotated about the central axis of said chamber, and means extending from each of said rotary connecting members to said tubular support members for angularly accelerating and decelerating said pistons when said rotary connecting members are revolving.

14. A rotary piston fluid displacement device comprising a stator assembly having an annular chamber, a plurality of rotary piston assemblies of the angular accelerating and decelerating type movable within said chamber about the central axis thereof, each of said assemblies including a tubular support member, a plurality of pistons mounted upon said tubular support member and extending therefrom into said chamber, a labyrinth seal means disposed adjacent the end portions of each of said tubular support members to prevent leakage from said chamber to said cavity, means for admitting fluid into said chamber, means for releasing fluid from said chamber, an external shaft, a pair of rotary connecting members each having its central axis of rotation offset from the central axis of said chamber, each of said rotary connecting members being disposed adjacent different opposite ends of said plurality of rotary piston assemblies, means in engagement with said stator for revolving the central axis of each of said connecting members about the central axis of said chamber, means for providing an eccentric pivotal connection between the central axis of one of said rotary connecting members and said external shaft, means extending from said rotary connecting members to said tubular support members for angularly accelerating and decelerating said pistons when said one rotary connecting member is revolving, additional means extending from the other of said rotary connecting members to the other portion of said plurality of tubular support members for angularly accelerating and decelerating said pistons when said other rotary connecting member is revolving, an additional rotary connecting member, and means extending from said additional rotary connecting member to each portion of said plurality of tubular supports for coupling said portions to one another.

15. A rotary piston fluid displacement device comprising a plurality of units, each unit including a stator assembly having an annular chamber, a plurality of rotary piston assemblies of the angular accelerating and decelerating type movable within said chamber about the central axis thereof, each of said rotary piston assemblies including a tubular support member, a plurality of pistons mounted upon said tubular support member and extending therefrom into said chamber, means for admitting fluid into said chamber, means for releasing fluid from said chamber, a pair of rotary connecting members each having its central axis of rotation offset from the central axis of said chamber, each of said rotary connecting members being disposed adjacent different opposite ends of said rotary piston assembly, means in engagement with said stator for revolving the central axis of each of said connecting members about the central axis of said chamber, means engaging said tubular support member and engaging said rotary connecting members for angularly accelerating and decelerating said pistons when said rotary connecting members are revolving; shaft means for connecting adjacent pairs of said units; and means for providing an eccentric pivotal connection between the central axis of one of said rotary connecting members of one of said adjacent pairs of said units and said shaft means.

16. A rotary piston internal combustion engine comprising a stator assembly having an annular chamber, a plurality of rotary piston assemblies of the angular accelerating and decelerating type movable along a common path of travel within said chamber about the central axis thereof, each of said assemblies including a tubular support member and a plurality of pistons mounted upon said tubular support member and extending therefrom into said chamber, each piston of each of said plurality of piston assemblies facing at least one piston of a different piston assembly, means for introducing a combustible fluid charge into said chamber, means for igniting said charge between an adjacent pair of said pistons, means for releasing exhaust fluid from said chamber, a crankshaft assembly consisting of a pair of separate shafts spaced apart from one another along the axis of rotation of said crankshaft assembly which extends along the central axis of said chamber, said shafts being disposed for rotation about said central axis, a pair of rotary connecting members each having a central axis of rotation and each being provided with an eccentric pivotal connection of its central axis with a different one of said shafts, the central axis of each of said rotary connecting members being offset from the central axis of said chamber, each of said rotary connecting members being disposed adjacent opposite ends of said plurality of rotary piston assemblies, means in engagement with said stator assembly for revolving each of said connecting members about its central axis as said central axes are rotated about the central axis of said chamber,, means extending from each of said rotary connecting members to said tubular support members for angularly accelerating and decelerating said pistons when said rotary connecting members are revolving.

17. A rotary piston internal combustion engine comprising a stator assembly having an annular chamber, a plurality of rotary piston assemblies of the angular accelerating and decelerating type movable within said chamber about the central axis thereof, each of said assemblies including a tubular support member, a plurality of pistons mounted upon said tubular support member and extending therefrom into said chamber, means for introducing a combustible fluid charge into said chamber, means for igniting said charge between an adjacent pair of said pistons, means for releasing exhaust fluid from said chamber, an external shaft, a pair of rotary connecting members each having its central axis of rotation offset from the central axis of said chamber, each of said rotary connecting members being disposed adjacent different opposite ends of said plurality of rotary piston assemblies, means in engagement with said stator for revolving the central axis of each of said connecting members about the central axis of said chamber, means for providing an eccentric pivotal connection between the central axis of one of said rotary connecting members and said external shaft, means extending from one of said rotary connecting members to a portion of said plurality of tubular support members for angularly accelerating and decelerating said pistons when said one rotary connecting member is revolving, additional means extending from the other of said rotary connecting members to the other portion of said plurality of tubular support members for angularly accelerating and decelerating said pistons when said other rotary connecting member is revolving, and an additional rotary connecting member, and means extending from said additional rotary connecting member to each portion of said plurality of tubular support members for coupling said portions to one another.

18. A rotary piston fluid displacement device comprising a stator assembly having an annular chamber, a plurality of rotary pistons of the angular accelerating and decelerating type movable within said chamber about the central axis thereof, means for admitting fluid into said chamber, means for releasing fluid from said chamber, means for bypassing compressed fluid in the direction of rotation of said plurality of pistons from one side of one of said plurality of pistons to the opposite side thereof, an external shaft, and means for coupling the movement of said pistons to said external shaft.

19. A rotary piston fluid displacement device comprising a stator assembly having an annular chamber, a plurality of rotary pistons of the angular accelerating and decelerating type movable within said chamber about the central axis thereof, means for admitting fluid into said chamber, means for releasing fluid from said chamber, said chamber having means for bypassing compressed fluid in the direction of rotation of said plurality of pistons from one side of one of said plurality of pistons to the opposite side thereof at a location between said means for admitting the fluid and said means for releasing the fluid, an external shaft, and means for coupling the movement of said pistons to said external shaft.

20. A rotary piston displacement device comprising a stator having an annular chamber, a plurality of rotary pistons of the accelerating and decelerating type movable within said chamber about the central axis thereof, means for admitting fluid into said chamber, means for releasing fluid from said chamber, said chamber having a recess therein extending along the path of travel of said pistons, said recess being adapted to bypass compressed fluid in the direction of rotation of said plurality of pistons from one side of one of said plurality of pistons to the opposite side thereof, an external shaft, and means for coupling the movement of said pistons to said external shaft.

21. A rotary piston fluid displacement engine comprising an annular chamber, a plurality of rotary pistons of the angularly accelerating and decelerating type movably disposed within said chamber, means for admitting fluid into said chamber, means for releasing fluid from said chamber, said chamber containing a recess disposed adjacent the path of travel of said pistons and between said admitting means and said releasing means, said recess being adapted to transfer fluid compressed adjacent the trailing side of one piston to the leading side of said one piston, means disposed adjacent said recess for initiating the expansion of said fluid adjacent said leading side of said one piston, an external shaft, and means for coupling the angularly accelerating and decelerating motion of said pistons to said external shaft.

22. A rotary piston fluid displacement device comprising a stator assembly having an annular chamber, a plurality of rotary piston assemblies of the angular accelerating and decelerating type movable within said chamber about the central axis thereof, each of said assemblies including a tubular support member, a plurality of pistons mounted upon said tubular support member and extending therefrom into said chamber, means for admitting fluid into said chamber, means for releasing fluid from said chamber, an external shaft, a pair of rotary connecting members each having its central axis of rotation offset from the central axis of said chamber, each of said rotary connecting members being disposed adjacent different opposite ends of said plurality of rotary piston assemblies, means in engagement with said stator for revolving the central axis of each of said connecting members about the central axis of said chamber, means for providing an eccentric pivotal connection between the central axis of one of said rotary connecting members and said external shaft, means extending from one of said rotary connecting members for angularly accelerating and decelerating the pistons thereof when said one rotary connecting member is revolving, additional means extending from the other of said rotary connecting members to the other portion of said plurality of tubular support members for angularly accelerating and decelerating said pistons when said other rotary connecting member is revolving, an additional rotary connecting member, and means extending from said additional rotary connecting member to each portion of said plurality of tubular support members for coupling said portions to one another, the means of said additional rotary member being distributed to a counterweight for balancing said device during the operations thereof.

23. A rotary piston fluid displacement device comprising a stator assembly having an annular chamber, a plurality of rotary piston assemblies of the angular accelerating and decelerating type movable within said chamber about the central axis thereof, each of said assemblies including a tubular support member, a plurality of pistons mounted upon said tubular support member and extending therefrom into said chamber, means for admitting fluid into said chamber, means for releasing fluid from said chamber, an external shaft, a pair of rotary connecting members each having its central axis of rotation offset from the central axis of said chamber, each of said rotary connecting members being disposed adjacent different opposite ends of said plurality of rotary piston assemblies, means in engagement with said stator for revolving the central axis of each of said connecting members about the central axis of said chamber, means for providing an eccentric pivotal connection between the central axis of one of said rotary connecting members and said external shaft, trammel gear means disposed adjacent one of said rotary connecting members and a portion of said plurality of tubular support members for angularly accelerating and decelerating the pistons thereof when said one rotary connecting member is revolving, additional trammel gear means disposed adjacent the other of said rotary connecting members and the other portion of said plurality of tubular support members for angularly accelerating and decelerating said pistons when said other rotary connecting member is revolving, an additional rotary connecting member, and further trammel gear means disposed adjacent said additional rotary connecting member and each portion of said plurality of tubular support members for coupling said portions to one another, the mass of said additional rotary connecting member being distributed to form a counterweight for balancing said device during the operation thereof.

24. A rotary piston fluid displacement device comprising a stator assembly having an annular chamber, a plurality of rotary piston assemblies of the angular accelerating and decelerating type movable within said chamber about the central axis thereof, each of said assemblies including a tubular support member having a radially extending slide, a plurality of pistons mounted upon said tubular support member and extending therefrom into said chamber, means for admitting fluid into said chamber, means for releasing fluid from said chamber, an external shaft, a pair of rotary connecting members each having its central axis of rotation offset from the central axis of said chamber, each of said rotary connecting members being disposed adjacent different opposite ends of said plurality of rotary piston assemblies, means in engagement with said stator for revolving the central axis of each of said connecting members about the central axis of said chamber, means for providing an eccentric pivotal connection between the central axis of one of said rotary connecting members and said external shaft, means extending from one of said rotary connecting members to the radially extending slides of a portion of said plurality of tubular support members for angularly accelerating and decelerating the pistons thereof when said one rotary connecting member is revolving, additional means extending from the other of said rotary connecting members to the radially extending slides of the other portion of said plurality of tubular support members for angularly accelerating and decelerating said pistons when said other rotary connecting member is revolving, an additional rotary connecting member, and means extending from said additional rotary connecting member to the radially extending slides of each portion of said plurality of tubular supports for coupling said portions to one another, the mass of said additional rotary connecting member being distributed to form a counterweight for balancing said device during the operation thereof.

25. A rotary piston fluid displacement device comprising a stator assembly having an annular chamber, a plurality of rotary piston assemblies of the angular accelerating and decelerating type movable within said chamber about the central axis thereof, each of said assemblies including a tubular support member, a plurality of pistons mounted upon said tubular support member and extending therefrom into said chamber, labyrinth seal means disposed adjacent the end portions of each of said tubular support member to prevent leakage from said chamber to said cavity, means for admitting fluid into said chamber, means for releasing fluid from said chamber, an external shaft, a pair of rotary connecting members each having its central axis of rotation offset from the central axis of said chamber, each of said rotary connecting members being disposed adjacent different opposite ends of said plurality of rotary piston assemblies, means in engagement with said stator for revolving the central axis of each of said connecting members about the central axis of said chamber, means for providing an eccentric pivotal connection between the central axis of one of said rotary connecting members and said external shaft, means extending from said rotary connecting members to said tubular support members for angularly accelerating and decelerating said pistons when said one rotary connecting member is revolving, additional means extending from the other of said rotary connecting members to the other portion of said plurality of tubular support members for angularly accelerating and decelerating said pistons when said other rotary connecting member is revolving, an additional rotary connecting member, and means extending from said additional rotary connecting member to each portion of said plurality of tubular supports for coupling said portions to one another, the mass of said additional rotary connecting member being distributed to form a counterweight for balancing said device during the operation thereof.

References Cited by the Examiner

UNITED STATES PATENTS

| | | | |
|---|---|---|---|
| 1,095,034 | 4/1914 | Sanchez et al. | 91—60 |
| 2,061,131 | 11/1936 | Bancroft | 123—11 |
| 2,155,249 | 4/1939 | Bancroft | 123—11 |
| 2,413,589 | 12/1946 | Snyder | 123—11 |
| 2,899,944 | 8/1959 | Patkau | 123—11 |

FOREIGN PATENTS 58,964  12/1953  France.
(French addition to 978,559)

SAMUEL LEVINE, *Primary Examiner.*

JOSEPH H. BRANSON, JR., *Examiner.*